July 5, 1960 M. RIGAUD 2,943,878
LOCKING DEVICE
Filed Dec. 21, 1956 4 Sheets-Sheet 1
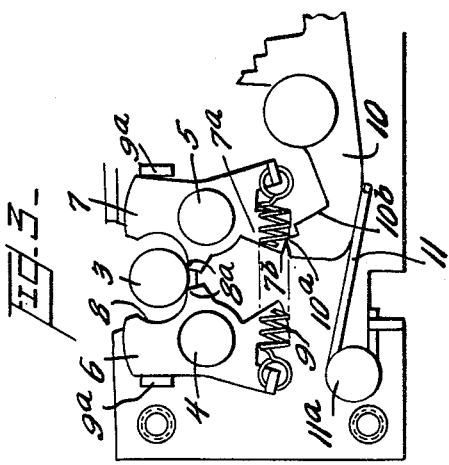
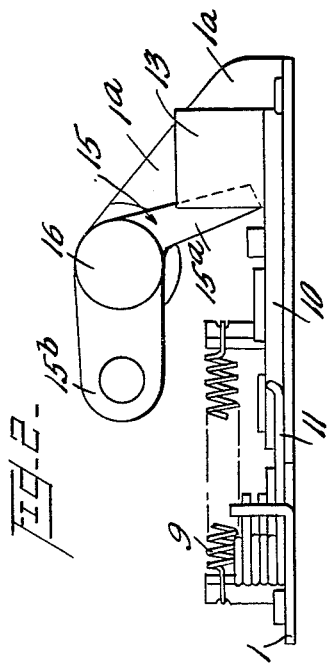
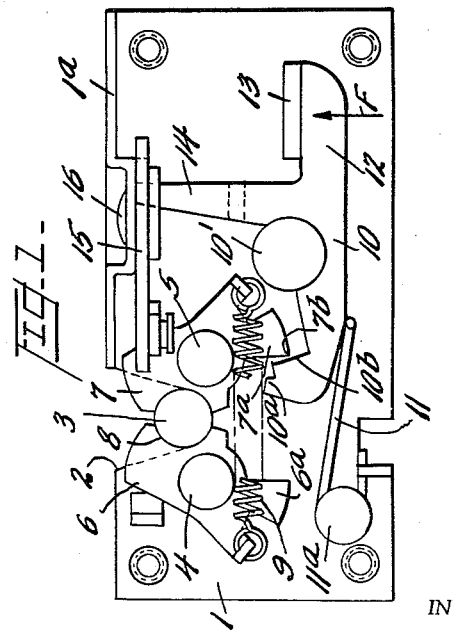
INVENTOR
Maurice Rigaud
BY Watson, Cole, Grindle & Watson
ATTORNEYS

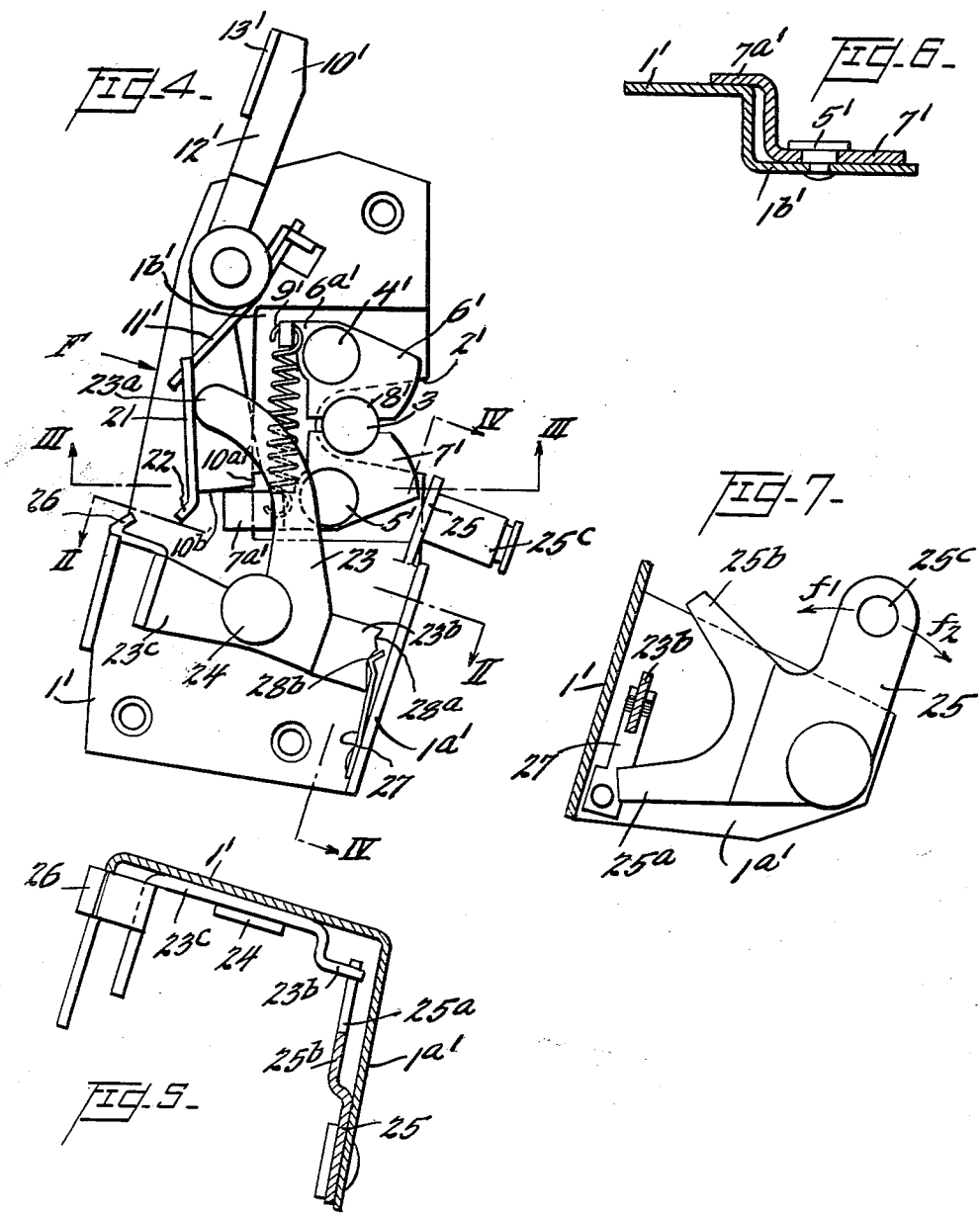

July 5, 1960
M. RIGAUD
2,943,878
LOCKING DEVICE
Filed Dec. 21, 1956
4 Sheets-Sheet 3
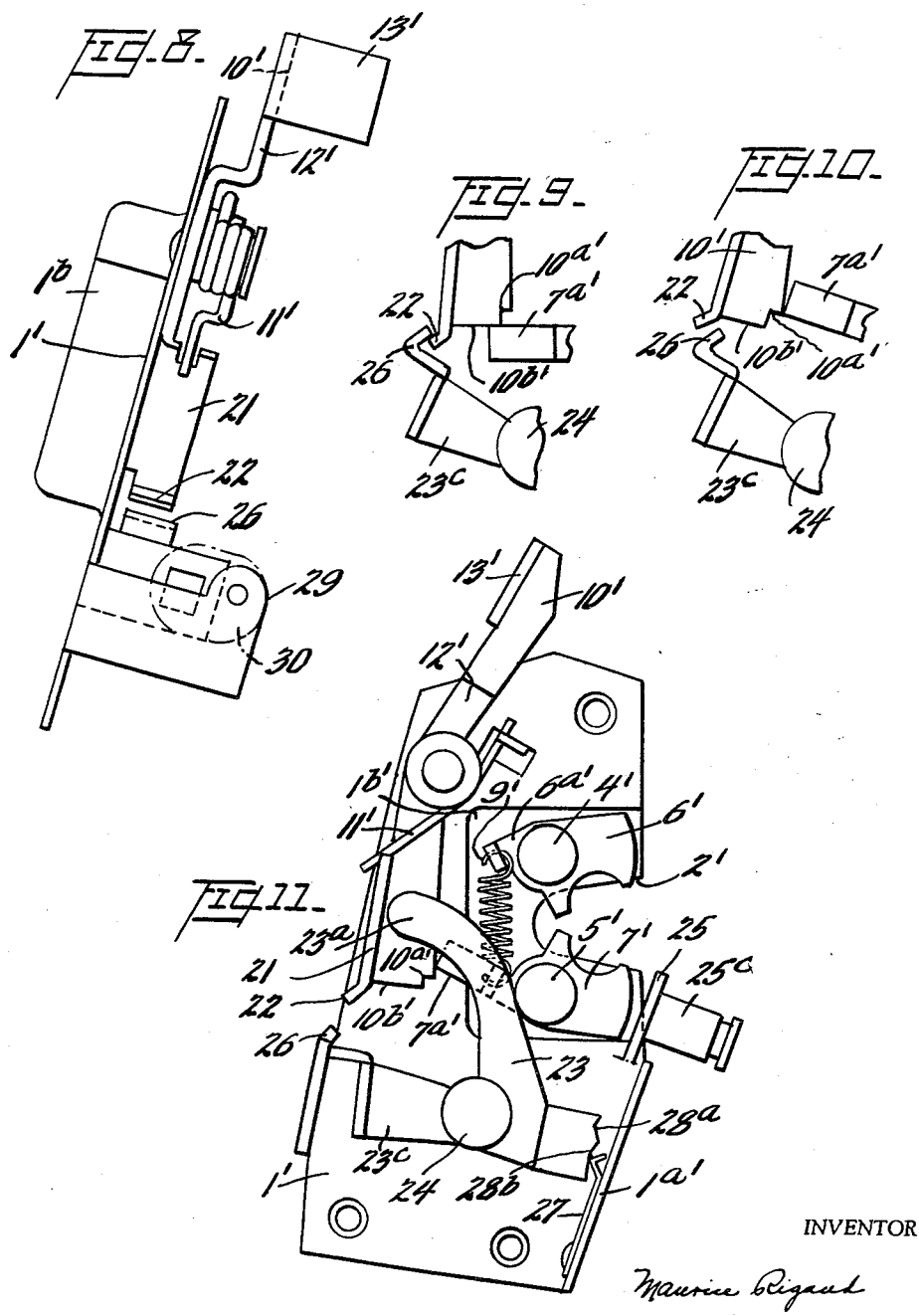
INVENTOR
Maurice Rigaud
BY Watson, Cole, Grindle & Watson
ATTORNEYS

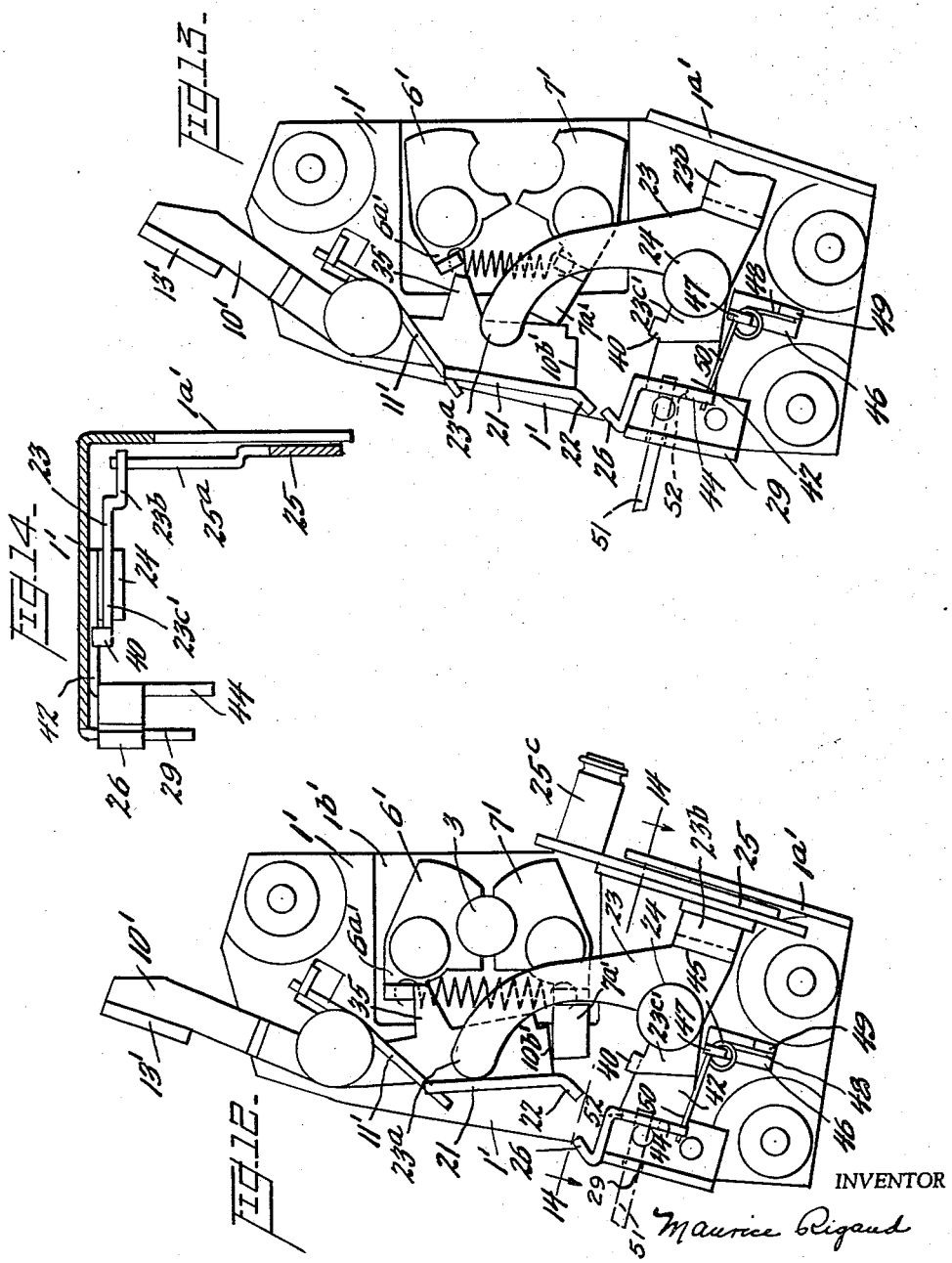

United States Patent Office 2,943,878
Patented July 5, 1960

2,943,878

LOCKING DEVICE

Maurice Rigaud, Paris, France, assignor to Societe des Agrafes Francaises & d'Articles Metalliques (Société Anonyme), Paris, France, a French company Filed Dec. 21, 1956, Ser. No. 629,942

Claims priority, application France December 21, 1955

16 Claims. (Cl. 292—44)

This invention relates to locking devices for closures of various kinds, whether doors, hatches, automobile hoods, trunk lids or the like, and more particularly to devices of this character which comprise two normally open jaws carried by one of the two members which are to be secured together and arranged to close with a certain amount of force on a stud or pin carried by the other of said members, when said jaws come into contact with said stud or pin; and which further include latching means for maintaining the said jaws blocked in gripping position with respect to said stud or pin.

In a known device of this type, the jaws are connected with each other by a sort of gearing arrangement which forces them to move in unison about their pivots, and when they are closed upon the pin, the blocking of the jaws is assured by a sliding element which under the pressure of a spring is engaged between rearward extensions provided on the jaws.

The present invention, in its preferred embodiments, contemplates the provision of a locking mechanism of the class described, which has the advantage over known devices, first, of being of simpler construction while providing maximum security, and second, of making it possible to compensate for play or lost motion due to wear of the various parts in course of time.

In the device which is the subject of the present invention, the two jaws, pivoted freely on the lock casing, are adapted to be blocked, when closed upon the stud or pin, by means of a lever, also freely pivoted on the casing, which is interposed in front of an extension on at least one of the jaws.

The lever member and the jaw member which it immediately controls, come into contact through the mutual engagement of surfaces on the respective members, one of which surfaces is inclined with respect to the other, whereby compensation for wear is assured.

The lever also presents the further advantage of being provided, upon its surface which is intended to cooperate with the jaw extension, with a step or notch which affords a safety position of the lock. The lever is preferably arranged so that it may be actuated or controlled either from the inside or the outside, in accordance with the nature of the door or other closure member with which the locking device is associated; and remote control of the lock may even be provided for.

Further objects of the invention include the provision of novel blocking mechanism for the basic locking device described which will prevent the opening of the lock under certain conditions, such blocking being of particular interest when the locking device is applied to closures of automobile vehicles. In accordance with this particular object, the blocking mechanism comprises a stop or catch which is adapted to be interposed in the path of the locking lever so as to prevent said lever from locking the jaw with which it cooperates.

This stop or catch is advantageously associated with a member which serves for opening the locking device from the inside of the vehicle, the said member being adapted to bring the stop or blocking catch into locking postion by displacement in a direction opposite to that normally given it in order to open the locking device.

Furthermore, the stop and the portion of the locking lever with which it cooperates are shaped in such a manner that if the locking device is blocked while the door is open, this blocking is automatically eliminated upon the closing of the door, which feature prevents the operator from locking his car unintentionally.

Other objects and features of novelty will be apparent from the following specification when read in connection with the accompanying drawings in which one embodiment of the invention is illustrated merely by way of example.

In the drawings:

Figure 1 is a plan view of a locking device embodying the principles of the invention;

Figure 2 is a view in side elevation of the same device;

Figure 3 is a fragmentary view similar to Figure 1 but with the jaws in open position;

Figure 4 is a somewhat diagrammatic plan view similar to Figure 1 but illustrating a modified form of lock exemplifying the principles of the present invention, the parts being in lock-closing position;

Figure 5 is a diagrammatic sectional view taken substantially on line II—II of Figure 4;

Figure 6 is a fragmentary sectional view taken approximately on line III—III of Figure 4;

Figure 7 is a fragmentary sectional view taken substantially on line IV—IV of Figure 4;

Figure 8 is a somewhat diagrammatic view in side elevation as seen in the direction of the arrow F in Figure 4;

Figure 9 is a fragmentary plan view showing certain blocking features in closed or locked position;

Figure 10 is a view similar to Figure 9 showing the same parts with the locking device blocked but the lock in open position;

Figure 11 is a view similar to Figure 4 but showing the locking device in open or unlocked postion;

Figure 12 is a view similar to Figure 11 but illustrating a still further modification of the invention;

Figure 13 is a view similar to Figure 12 with the parts in open position; and

Figure 14 is a sectional view taken substantially on line V—V of Figure 12.

In the embodiment of the invention illustrated in Figures 1–3 of the drawings, the lock comprises a base plate or support 1 which may form a part of the lock casing, said base plate having a slightly rounded notch 2 which is adapted to receive the stud or pin 3, which stud is preferably cylindrical in configuration.

Due to its rounded form, notch 2 forms a tapering or wedge entry for the pin in the usual way.

Two jaw elements 6 and 7, each of which is formed with a notch 8 adapted to cooperate with the stud 3, are movably mounted on each side of the slot or notch 2, on pivot pins or axles 4 and 5. Jaw elements 6 and 7 are connected rearwardly of their pivots 4 and 5 by a tension spring 9 which serves to urge the gripping or locking portions of the jaws toward open position as shown in Figure 3. Stops 9a are provided to limit the opening movement of the jaw elements. Each of the jaw elements also has a rearward non-gripping or non-locking extension 6a and 7a upon the latter side of the pivots.

Adjacent the rearward extension or non-gripping arm 7a of the jaw element 7, there is disposed one end of a lever member 10 (Figure 1) this end portion terminating in a nose which is characterized first by a stepped notch or shouldered portion 10a, and second, by an inclined surface 10b, said lever being so arranged that the stepped notch 10a and the sloping or inclined wedging surface 10b can be brought into the path of the edge 7b of the non-gripping arm or extension 7a during movements of the corresponding jaw element 7.

Lever 10 is subjected to the action of the spring 11 which is retained by means of the stud 11a, this spring tending to urge the nose of the lever 10 toward the arm or extension 7a. When the jaw elements are open as shown in Figure 3, the nose of the lever 10 presses against the extreme end surface of the arm or extension 7a.

The lever 10 is pivoted on the projection or stud 10' and has an extending arm 12 which carries a blade or flange 13 against which a push rod or other lock actuating member (not shown) may press (as indicated by the arrow F in Figure 1). This makes it possible to operate the lock from a point exterior of the lock casing.

The operating lever 10 also has a rectilinear arm 14 which projects into the path of the lower arm 15a of an L-shaped lever 15. This lever 15 is articulated to a flange 1a on the base plate 1 by means of the pivot member 16 and suitable connections may be made with the other arm 15b of the lever 15 for actuating the lock from a remote point.

The operation of the lock device illustrated in Figs. 1–3, inclusive is as follows:

Let us suppose that pin or stud 3 is fixed to a stationary member such as a door jamb, and the lock device proper is installed upon a door. Then if the door is closed with a certain amount of force, the striking of the pin on the heel portions 8a of the notches 8 (Figure 3) forces the jaw elements to close on the stud or pin 3. While they are closing, the end face of extension 7a slides along the end portion of lever 10 and the edge 7b at first catches on the stepped notch 10a. If the shock of closing is sufficient, this edge reaches beyond the stepped notch and is caught on the inclined or sloping wedge-like surface 10b of the lever. The angle of this sloping surface is so chosen with respect to the jaw element that the jaws are held in firm position about the stud or pin at all times regardless of the tendency of the wear on the parts to produce lost motion or play.

To open the locking device it is sufficient to pivot the lever 10 around its axis, either by acting upon the blade 13, or by means of the handle lever 15 which engages arm 14 of the lever 10. The jaw elements are then freed and they will open under the action of the spring 9. The opening movement is accompanied by a reaction of the nose or heel portions 8a upon the stud 3, which reaction causes the door to begin its opening movement.

In the embodiment shown in Figures 4–11 inclusive of the drawings there can be recognized the principal members of the locking device described in Figures 1–3 and these corresponding members are given the same reference numeral with a prime added.

In order to save space, the jaws 6' and 7' are housed in a recess 1b' formed by an offset portion of the plate 1' (Figures 4, 6 and 8), the extension 7a' of the jaw 7' being bent so as to slide against the plate itself (Figure 6).

The locking lever 10' has an extension 21 (Figures 4 and 8) preferably produced by bending back a portion of the part which constitutes the main body of the lever, which extension or flange 21 terminates in a nose 22 which is curved toward the outside with respect to the blocking edge 10b of the lever.

The opening of this embodiment of the locking device can be effected on the one hand by directly pressing upon the handle or abutment flange 13' of the lever 10', generally from the outside when the locking device is mounted on the door of a vehicle, and on the other hand, by means of a plural armed lever 23 pivoted at 24 to the base plate, one arm 23a of which is curved with the end adapted to press against the extension flange 21 of the lever 10'.

This lever 23 is controlled and actuated by a forked second lever 25 pivoted on an angle or flange portion 1a' of the plate 1' (Figure 7), which for this purpose has an arm 25a which cooperates with the arm 23b of the lever 23. A handle or connecting portion 25c may be applied to the operating arm of the lever 25. This lever system serves for the control of the lock from the inside when the device is used in connection with automotive vehicle doors.

The blocking of the locking arrangement is effected by means of a stop projection 26, the end of which is curved toward the interior of the locking device, this stop 26 being carried by an arm 23c of the lever 23, in such a way that it can be interposed in the path of the nose 22 of the lever 10' so as to prevent the lever from being turned sufficiently to release the jaw 7' and thus effect the opening of the jaws. A spring catch element 27 cooperating with the notches 28a and 28b provided in the section 23b of the lever 23, makes it possible temporarily to immobilize the lever 23 either in the blocked position or in the position in which the locking device is not blocked.

The lever 23 can be brought into blocking position by the action of an arm 25b of the lever 25 which presses against the opposite side of the arm 23b (Figure 7).

The operation of the mechanism shown in Figures 4–11 inclusive may be described as follows.

As manipulated from the inside of the door, the stop 26 is brought into blocking position by the operator moving lever 25 in the direction of the arrow $f^1$, Figure 7, which is the opposite direction from that required to open the device. The spring 27 then engages in the notch 28a and the arm 23c with its catch or blocking element 26 occupies the position shown in Figures 9 and 10.

If it be assumed that the jaws are at that time closed on the lock pin or stud 3 and blocked by the lever 10' (as in Figure 9), any action from the outside (to the left in Figures 4 and 11) on the lever will cause the nose 22 to engage beneath the stop 26 (Figure 9) and the section 10b' of the lever 10' cannot release the extension 7a' of the jaw 7. The locking device can therefore not be opened from the outside by direct manipulation of the lever 10'.

If the operator presses even lightly upon the lever 25 in the opening direction (arrow $f^2$ in Figure 7) the arm 25a exerts a pivotal force on the lever 23 so as to bring the stop 26 outside of the path of the nose 22, the spring catch 27 being then engaged in the notch 28b. Thus the locking device is unblocked.

By continuing the pressure on the lever 25 the release of the lever 10 is effected, which correspondingly releases the jaws.

If it is assumed that the stop 26 has been brought into blocking position while the door was open, as shown in Figure 10, the stop 26 is disposed toward the inside of the locking device with respect to the nose 22 of the lever 10', which lever is resting against the end of the extension 7a' of the jaw 7'. Then when the door is closed, the jaws close upon the pin or stud and the extension 7a' moves away from in front of the lever 10' and the spring 11 urges the lever in the direction toward the jaws.

Since the spring 11 has been selected to be more powerful than the spring catch 27 associated with the lever 23, when the nose 22 encounters the stop 26 and acts upon it obliquely, it pushes the stop back, which movement brings the lever 23 into the unblocked position in which it is then held by engagement of the spring catch 27 in the notch 28b. Thereupon the lever 10' engages in front of the shank or extension 7a' of the jaw 7 and locks the jaw.

In the embodiment illustrated in Figures 12–14 inclusive, there are incorporated at least two advantageous modifications over those already described in connection with the earlier figures. One of these is the provision of two blocking portions on the principal lever, and the other relates to a certain flexibility provided by making the blocking arm 23c of the lever 23 in two parts operatively associated by means of a spring.

The basic elements of this embodiment of the lock have been given similar reference numerals to those shown in Figures 4-11 of the drawings, while the departures from the earlier described structure are designated by new reference characters.

In Figures 12 and 13 it will be readily seen that there is provided a projecting abutment 35 on the inner side of the jaw controlling arm of the lever 10' and this projection when the device is in locked position, comes into wedging abutment contact with the short shank portion 6a' of the jaw 6'. Thus it will be seen that the jaw 6' is effectively blocked at the same time that the wedging surface 10b' at the extreme end of the lever 10' is blocking the extension 7a' of the jaw 7'.

In this embodiment, the arm of the lever 23 which was designated 23c in the previously described embodiment is now cut short and indicated at 23c', and provided with a depending finger or abutment 40, and the blocking element 26 is carried by a separate lever 42 which has an upstanding flange 44 at the extremity of which the stop 26 is formed. A spring 45 is carried by a block 46 secured to the plate 1' and the spring loop passes through an eye 47 formed on the block 46 while the end 48 of the spring abuts a projection 49 on the block 46. The operative arm 50 of the spring presses against the flange 44 of the lever 42 and urges it in a direction toward the abutment finger 40 of the stub lever 23c'. If desired, this embodiment can be provided with a key control to be manipulated from outside of the closure.

For example any sort of keying element such as a pin 51 may be inserted through an opening 52 in the flange 44 and the arm 42 with the blocking element 26 brought into and out of blocking position with respect to the projection 22' either in conjunction with the operating lever 23, or independently thereof as permitted by the spring 45.

It is understood that modifications and changes may be made in the embodiments of the invention herein described, for example, by the substitution of patentable equivalents, without departing from the scope of the present invention, which is determined by the subjoined claims.

Having thus described the invention, what is claimed as new and desired to be secured by Letters Patent is:

1. A locking device for use in cooperation with a stud with which it is adapted to come into locking engagement, said device comprising, in combination, a supporting base member, a pair of oppositely disposed jaw elements pivotally mounted on said base member and having opposed locking arms adapted to move toward each other to lock such a stud therebetween and at least one of said jaws having oppositely extending non-locking arms arranged to move in the opposite direction as its corresponding locking arm moves toward the other, means coacting between said jaw elements yieldably urging said locking arms apart, a lever having a blocking arm with a blocking portion rigidly associated with the free end of the blocking arm, means for pivotally mounting said lever directly on the said supporting base member, said lever being pivotable to a blocking position in which said blocking portion extends into engagement with an integral part of the non-locking arm of one of said jaw elements to prevent the locking arm of the latter jaw element from disengaging the stud, and means effective continuously upon said lever tending to pivot the latter toward its said blocking position, and a lever-blocking device, including a stop element and means for interposing said stop element in the path of said blocking lever so as to prevent said lever from unlocking the jaw element with which it cooperates.

2. A locking device for use in cooperation with a stud with which it is adapted to come into locking engagement, said device comprising, in combination, a supporting base member, a pair of oppositely disposed jaw elements pivotally mounted on said base member and having opposed locking arms adapted to move toward each other to lock such a stud therebetween and at least one of said jaws having oppositely extending non-locking arms arranged to move in the opposite direction as its corresponding locking arm moves toward the other, means coacting between said jaw elements yieldably urging said locking arms apart, a lever having a blocking arm with a blocking portion rigidly associated with the free end of the blocking arm, means for pivotally mounting said lever directly on the said supporting base member, said lever being pivotable to a blocking position in which said blocking portion extends into engagement with an integral part of the non-locking arm of one of said jaw elements to prevent the locking arm of the latter jaw element from disengaging the stud, and means effective continuously upon said lever tending to pivot the latter toward its said blocking position, and a second lever pivotally mounted on said base member, said second named lever having an arm which is adapted to contact and move said first named blocking lever toward jaw unlocking position, a blocking device for said jaw-blocking lever, said blocking device including a stop element, means operatively connecting said stop element with said second named lever so as to be interposed in the path of said first named blocking lever to prevent the blocking lever from unlocking the jaw elements with which it cooperates.

3. The locking device as set forth in claim 2 in which said stop element is operatively connected with a second arm of said second named lever and adapted to be brought into blocking position upon movement of said second named lever in a direction opposite to that in which it moves to cause its first named arm to operate the jaw-blocking lever to unlocking position.

4. The locking device as set forth in claim 3 in which a third arm is provided on said second named lever, and means are provided for acting upon said third arm to move said lever in opposite directions, and means for retaining it in either position into which it is moved.

5. The locking device as set forth in claim 3 in which there is provided a third lever having a bifurcated portion adapted to straddle the third arm of said second named lever and to contact and move said second named lever in opposite directions to respectively lock and unlock the locking device.

6. The locking device as set forth in claim 3 in which said stop element is carried on a supplemental lever having a common pivot with said second named lever, an abutment on said second named lever for contacting said supplemental lever, a spring for urging said supplemental lever to contact with said abutment so that the supplemental lever will move coincidentally with said second named lever, but upon yielding of said spring the supplemental lever and its associated stop element may move independently of said second named lever.

7. The locking device as set forth in claim 6 in which key means are provided for moving said supplemental lever and said stop element to unlock the jaw blocking lever, said key means adapted to be actuated from outside the closure control by said locking device.

8. The locking device as set forth in claim 2 in which the jaw blocking lever is provided with an angled projection and the lever-blocking stop element is also provided whereby both of these parts are provided with oblique surfaces and when said parts come into blocking contact with the stop element positioned behind the lever projection, they engage to prevent relative movement, but whenever the stop element is in front of the lever projection, as when the stop element has been brought into blocking position while the blocking lever is in lock-open position, the movement of the lever projection toward locking position wedges said stop element away from its lever-blocking position.

9. A locking device for use in cooperation with a stud with which it is adapted to come into locking engagement, said device comprising, in combination, a supporting base member, a pair of oppositely disposed jaw elements pivotally mounted on said base member and having opposed locking arms adapted to move toward each other to lock such a stud therebetween and opposed non-locking arms arranged to move apart as said locking arms move toward each other, means coacting between said jaw elements yieldably urging said locking arms apart, a lever having a blocking arm with a blocking portion rigidly associated with the free end of the blocking arm, means for pivotally mounting said lever directly on the said supporting base member, said lever being pivotable to a blocking position in which said blocking portion extends between said non-locking arms and into engagement with an integral part of the non-locking arm of one of said jaw elements to prevent the locking arm of the latter jaw element from disengaging the stud, and means effective continuously upon said lever tending to pivot the latter toward its said blocking position, the means for pivotally mounting said lever on the base member being located laterally beyond said jaw elements, said lever extending transversely of the general extent of said jaw arms and being provided with a hooked arm portion which extends around the end of the non-locking jaw arm with which it cooperates and, when in operative locking position, engages an inner side of the end of said last named jaw arm and extends between the two non-locking jaw arms.

10. The locking device as set forth in claim 9 in which said lever has a second arm extending in the opposite direction from said hooked arm portion, and thus in substantial alignment therewith, and provided with an abutment portion adapted to be acted upon by operating means for said lock.

11. The locking device as set forth in claim 10 in which said lever is provided with a third arm extending substantially perpendicularly with respect to said aligned arms, and a second lever is pivoted to a portion of said base member and adapted to be swung to contact said third arm and move the first named lever, and means are provided for actuating said second lever from a remote point.

12. The locking device as set forth in claim 11 in which said second lever is angular and is pivoted at its angle portion for swinging movement in a plane at right angles to the plane of said first named lever and the locking jaws, and one arm of said second named lever is adapted to abut the third arm of said first named lever in order to move it, and said remote actuating means is connected with the second angular arm of said second named lever.

13. The locking device as set forth in claim 9 in which the hooked end of said lever is provided with a stepped notch portion which affords an intermediate safe-locking position.

14. The locking device as set forth in claim 9 in which the hooked end of said lever is provided with an inclined portion which wedgingly engages the said non-locking arm at an angle, to apply locking pressure through said arm to the jaw without play regardless of wear.

15. The locking device as set forth in claim 9 in which the hooked end of said lever is provided with a stepped notch portion which affords an intermediate safe-locking position and also an inclined portion beyond said notch portion which wedgingly engages the said non-locking arm at an angle to apply locking pressure through said arm to the jaw without play regardless of wear.

16. A locking device for use in cooperation with a stud with which it is adapted to come into locking engagement, said device comprising, in combination, a supporting base member, a pair of oppositely disposed jaw elements pivotally mounted on said base member and having opposed locking arms adapted to move toward each other to lock such a stud therebetween and opposed non-locking arms arranged to move apart as said locking arms move toward each other, means coacting between said jaw elements yieldably urging said locking arms apart, a lever having a blocking arm with two blocking surfaces thereon, means for pivotally mounting said lever directly upon the said supporting base member, said lever being pivotable to a blocking position in which both of said blocking portions extend between said non-locking arms of the jaws, one of said portions moving into engagement with an inward part of the non-locking arm of one of said jaw elements and the other of said portions extending into engagement with the inward part of the non-locking arm of the other of said jaw elements to prevent the locking arms of the jaw elements from disengaging the stud, and means effective continuously upon said lever to urge the latter pivotally toward its jaw blocking position.

References Cited in the file of this patent

UNITED STATES PATENTS

| 621,574 | Kinsey | Mar. 21, 1899 |
| 2,151,181 | Appell | Mar. 21, 1939 |
| 2,646,299 | Kramer | July 21, 1953 |
| 2,668,071 | Adams | Feb. 2, 1954 |
| 2,677,262 | Vigmostad | May 4, 1954 |
| 2,749,166 | Linder | June 5, 1956 |

FOREIGN PATENTS

| 765,268 | Great Britain | Feb. 22, 1955 |